United States Patent [19]

Braun

[11] 4,044,618

[45] Aug. 30, 1977

[54] MACHINE DRIVE MECHANISM

[76] Inventor: Anton Braun, 6421 Warren Ave., Minneapolis, Minn. 55435

[21] Appl. No.: 666,697

[22] Filed: Mar. 15, 1976

[51] Int. Cl.² .................................................. F16H 19/04
[52] U.S. Cl. ............................................... 74/29; 92/146
[58] Field of Search .............. 74/29; 417/521; 92/146

[56] References Cited

U.S. PATENT DOCUMENTS

| 947,908 | 2/1910 | Heglar | 74/29 |
|---|---|---|---|
| 1,581,439 | 4/1926 | Gray | 74/29 |
| 2,034,069 | 3/1936 | Walti | 417/521 |
| 2,693,758 | 11/1954 | Pierce | 417/521 |
| 2,916,205 | 12/1959 | Litz | 92/146 |
| 3,609,974 | 10/1971 | Lado | 92/146 |

Primary Examiner—Samuel Scott
Assistant Examiner—Wesley S. Ratliff, Jr.
Attorney, Agent, or Firm—Alan M. Staubly

[57] ABSTRACT

A machine drive mechanism between a power unit and an energy absorbing unit, such as a compressor unit. The power unit may be connected to a crosshead carrying a pair of spaced and inwardly facing racks or to a double rack member and the compressor unit may be connected to one end of a piston-like guide and seal member which, in turn, is pivotally connected to one end of the double rack or the pair of spaced racks. The double rack extends between a pair of pinion gears mounted on fixed shafts and operably engaging the spaced racks and the double rack. When the power unit is directly connected to the energy absorbing device, the spaced racks merely serve as counterbalancing means. The power unit may also be connected by a relatively long unpivoted shaft to the energy absorbing unit either directly or through the racks by a connection providing transverse flexing movement between the double rack and the shaft. A yoke may also be provided between two parallel piston rods with a central connection with the guide and a floating connection with said rods to prevent transfer of transverse vibrations of either to the other. These arrangements give better load distribution between the gear teeth and thus greater strength and better wear.

15 Claims, 5 Drawing Figures

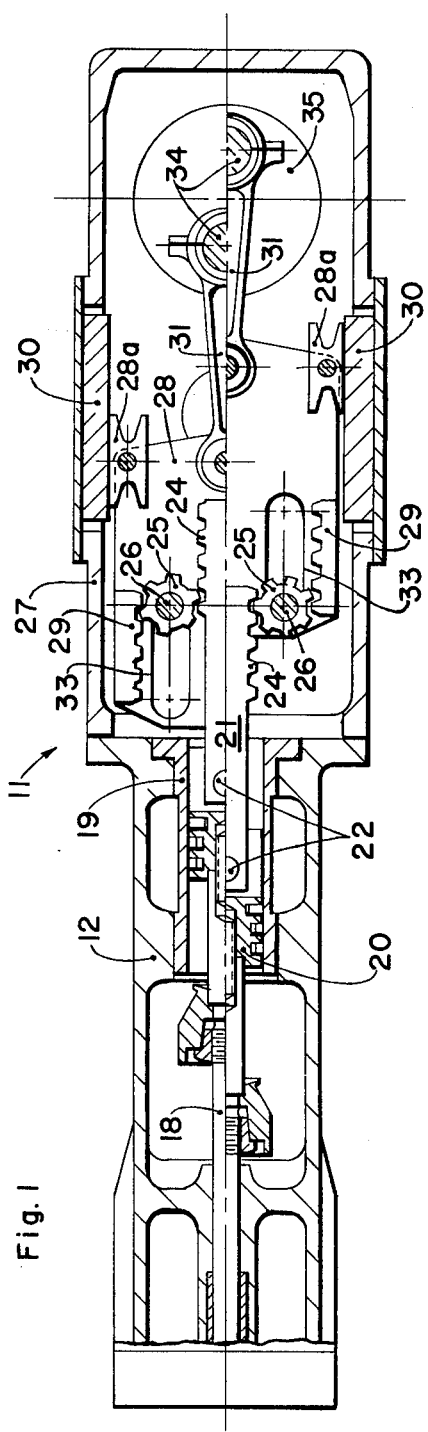
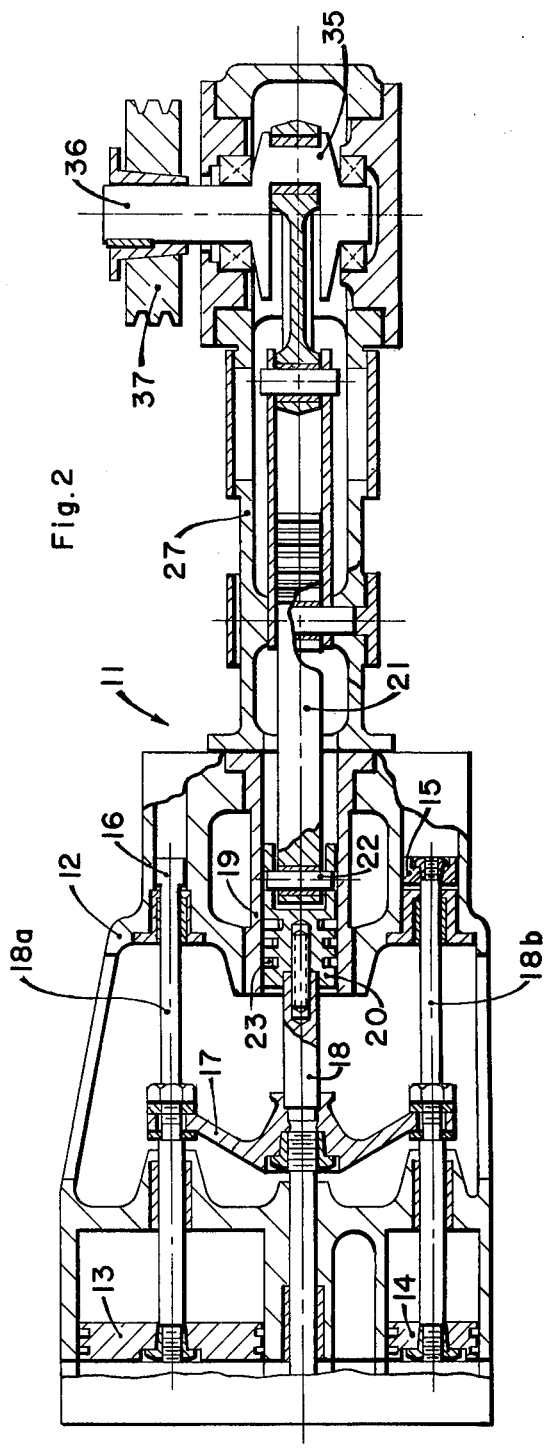
Fig. 1
Fig. 2

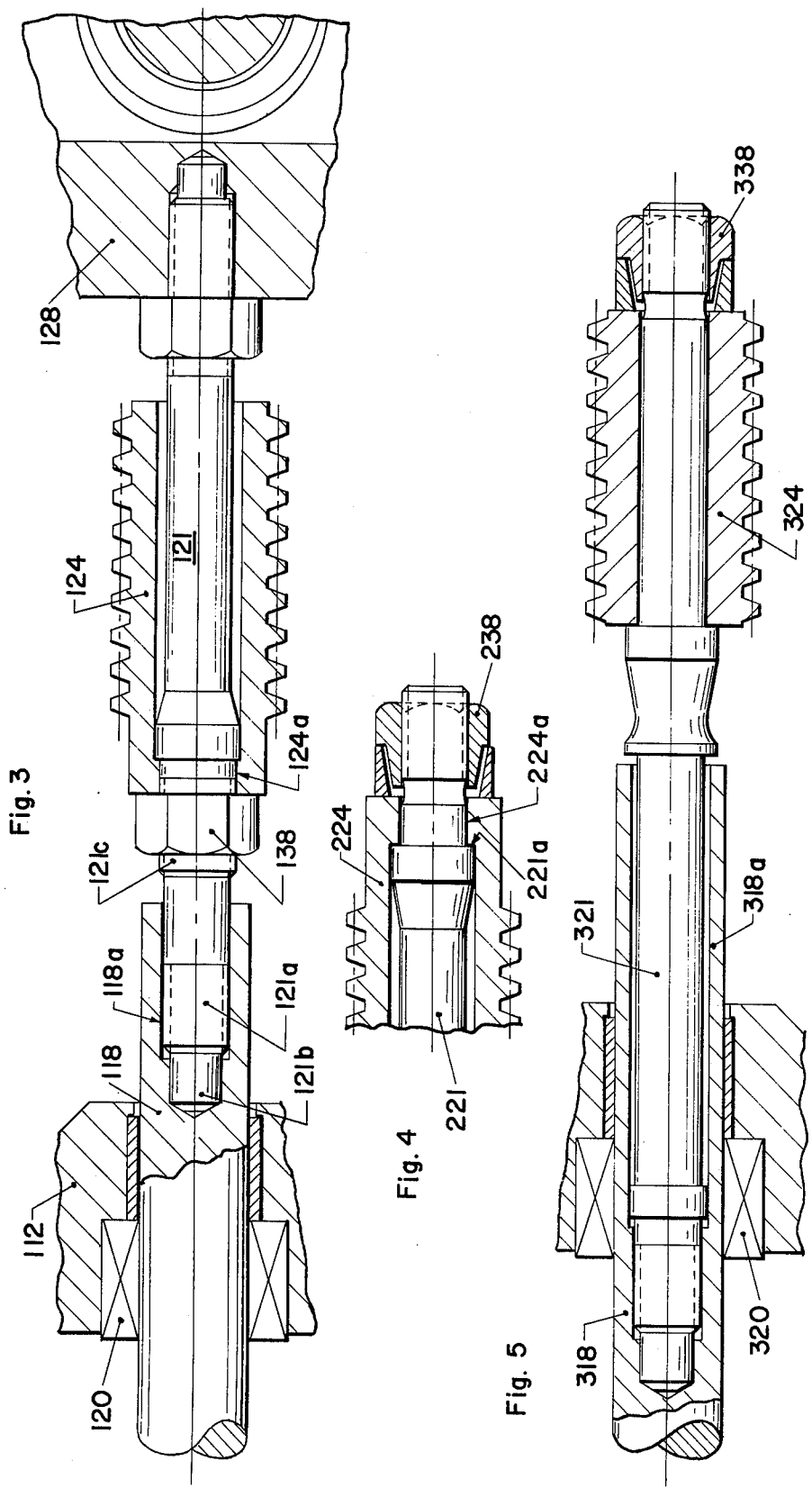

MACHINE DRIVE MECHANISM

Compressors with rack and pinion driving means between a power unit, such an an electric motor, and a compressor unit, such as a piston in a cylinder, are well known in the art. Some are illustrated in my U.S. Pat. No. 3,861,223.

This application is a continuation in part of my application Ser. No. 587,410 filed June 16, 1975, and is concerned with an improved machine drive mechanism, such as between the power unit and the compressor unit in the above mentioned patent, wherein a floating action arrangement is provided for a double rack in combination with a dual-function guide and seal connection between the double rack and an energy absorbing device or unit. The floating of the double rack between the gears, due to the rack's pivotal or flexible connection with a piston rod extending from the energy absorbing device, reduces the tendency of the rack's guide to vibrate and to bind and therefore keeps leakage and friction to a minimum. Also because of the floating gear structure, there is a reduction in the dynamic tooth stresses or an increase in the tooth load carrying capacity. The smaller the mass of the floating portion of the gear train, the greater the benefit of the floating arrangement, because the teeth can adjust to tooth errors faster. Sealing means between the guide and its supporting surface prevents oil or other contaminents from escaping from the power section into the energy absorbing device or vice versa especially because it does not vibrate.

FIG. 1 of the drawing is a fragmentary and schematic vertical sectional view of one embodiment of the invention in a compressor;

FIG. 2 is a similar plan view of the embodiment of FIG. 1;

FIG. 3 is an enlarged fragmentary sectional view of a modified form of a drive shaft between the units, providing transverse movement of the double rack and wherein transversely spaced racks merely serve as counter-balancing means;

FIG. 4 is a view similar to that of FIG. 3 of another modification of a floating double rack connected to only one of said units; and FIG. 5 is another view, similar to FIG. 4, of a still further modification of the invention.

Suitable bearings are provided around piston rod 18a, on which pistons 13 and 16 are mounted, and piston rod 18b on which pistons 14 and 15 are mounted. In high pressure machines, which require very small clearances between the cylinders and pistons, most exact guiding of the pistons is required. Although the floating double rack already reduces vibration of shaft 18 to a minimum, when bearing wear and slack develops, it is possible that piston rods 18a and 18b could vibrate. In order to avoid this potential action of these piston rods, and to allow looser machining tolerances, yoke 17 connects the piston rods 18a and 18b to a piston rod 18, which is axially slidable in the compressor unit. The yoke has holes in the ends thereof which are larger than the diameter of the piston rods extending through the holes so as to allow transverse movement of the yoke with respect to rods 18a and 18b between spaced abutment shoulders on the rods. A bearing sleeve 19 in unit 12 slidably supports a piston-shaped guide or piston rod portion 20 therein. One end of the guide is suitably connected to rod 18 while the other end has a pivotal connection with one end of a double rack member 21 through a pivot pin 22. The guide preferably has sealing rings 23 in annular grooves therein but, for some applications, the guide may be non-grooved and sealing means provided in annular grooves in the bearing sleeve. It is thus seen that no transverse vibrations of either rod 18 or rods 18a and 18b will be transmitted therebetween.

The other end of member 21 has rack teeth 24 thereon which engage the teeth on pinion gears 25. The gears are mounted on fixed shafts 26 in a power unit housing 27. A crosshead 28 has a pair of spaced racks 29 at one end thereof which respectively engage one each of the pinion gears while the other end thereof slidably engages guide members 30 through bearing shoes 28a. The center portion of the crosshead at said other end is pivotally connected to one end of a connecting rod 31 by a pin 32. Slots 33 in the crosshead, through which pins 26 extend, enables the crosshead to move between the two positions shown.

The other end of connecting rod 31 is connected to a shaft 34 of a crank arm 35 which is part of a crankshaft 36. A belt pulley 37 is secured to the end of the crankshaft that projects out of housing 27. The pulley may be driven by any suitable power means, such as an electric motor (not shown).

In operation, as the pulley is rotated, the crank drives the racks back and forth. When racks 29 move to the left, rotating gears 25, the double rack floats between the gears and is driven by them to the right, and, vice versa, when racks 29 move to the right, the double rack moves to the left. The pivotal connection between the double rack and the compressor's piston rod as illustrated in FIGS. 1 and 2, permits this floating action and at the same time prevents vibration and binding action between the guide 20 and bearing sleeve 19. The movement of the piston rod back and forth causes the compressor pistons to function in a well known manner.

If desired, the drive mechanism may be reversed so that the rod 18 carries the spaced racks 29 and the guide 20 is connected to the connecting rod 31. Also, other arrangements may be provided to permit the double rack to float between the gears 25.

FIG. 3 illustrates a modification of the invention wherein a stem extension 121 has a rigid and prestressed threaded connection with a piston rod 118. A reduced diameter portion 121a has a tight fit in a stepped bore 118a, with a beveled end 121b pressing hard against the inner end of the bore. The prestressing distributes the loading on the threads over most of the threads rather than only the first few. The rod 118 extends through and is guided by a bearing seal 120 in unit 112. Stem extension 121 extends through double rack 124, and an internal flange 124a, on one end of the double rack is clamped against an annular shoulder 121c by a nut 138. The other end of the stem extension has a rigid and prestressed threaded connection with a crosshead 128 similar to the crosshead 28 of FIG. 1. A small space is provided between the inner surface of the double rack and the stem 121 so as to allow for some flexing of the free end of the rack with respect to the stem as well as flexing of the double rack with respect to the axis of the guide rod 118, which gives better gear teeth engagement. With this arrangement, a pair of spaced racks, (not shown) but similar to racks 29 are on a pair of rigid connecting plates separate from crosshead 28 and mainly serve as counterbalancing means.

The modification of FIG. 4 differs from that of FIG. 3 in that the end of guide rod 221 is connected to the adjacent end of double rack 224 rather than to the crosshead. An inwardly extending flange 224a is clamped between a shoulder 221a on stem 221 and a nut 238 on the threaded end of the stem.

The modification of FIG. 5 differs from that of FIG. 4 in that the flexible length of the stem 321 is positioned in slightly spaced relationship with the inside surface of an elongated stepped bore 318a in rod 318 rather than in the double rack 324.

The overall operation of the mechanism of FIGS. 3, 4 and 5 is generally the same as that of FIGS. 1 and 2. The main difference lies in having the double rack float between the gears 25 by the flexing of the stems connected to the double racks rather than by having the double rack pivot with respect to the piston rod. In the FIG. 3 and FIG. 4 modifications the double racks can also flex with respect to the stems.

I claim:

1. A machine drive mechanism for use between a power unit and an energy absorbing unit comprising a counterbalancing and floating rack and pinion mechanism between the units including an axially reciprocable guide means, a pair of spaced and rigidly connected gear racks symmetrically spaced with respect to the axis of said guide means and reciprocable thereon, a double rack member extending between and spaced from said gear racks and reciprocable on said axis, one of said pair of spaced gear racks and double rack member being connected to said guide means so as to permit some lateral movement of the double rack member and spaced gear racks with respect to the axis of said guide means, a pair of gears pivoted on fixed pivots with one each of said gears operably engaging one each of the gear racks on said double rack member and said pair of spaced gear racks for causing said pair of spaced racks and double rack to move in opposite directions and means for connecting one of said pair of spaced gear racks and double rack member to a power source, the masses of the oppositely moving elements of the drive mechanism and the reciprocable elements of the power unit and the energy absorbing unit to be connected thereto being substantially equal.

2. The combination of claim 1 wherein said guide means includes means to prevent contaminants from leaking between the power unit and the energy absorbing unit.

3. The combination of claim 2 wherein the leak preventing means are sealing rings in annular grooves in the guide means.

4. The combination of claim 1 wherein said double rack member is elongated with one end thereof being pivotally connected to said guide means and the other end thereof being positioned between the gear teeth of said pair of gears.

5. The combination of claim 4 wherein said means for rotating said gears includes a pair of spaced racks at one end of a crosshead and means for connecting said crosshead to the power unit includes a pivot located centrally in and near the other end of said crosshead.

6. The combination of claim 1 with a compressor unit having four series arranged compressor cylinders and four pistons and means for floatingly connecting all of said pistons to said guide means.

7. The combination of claim 6 wherein the pistons of the first and fourth stage compressor cylinders are on one piston rod and the second and third stage compressor pistons are on a second piston rod and both piston rods are connected to said guide means by a yoke.

8. The combination of claim 7 wherein the floating connection of the yoke to each of the pistons is between the ends of the yoke and the piston rods of said pistons.

9. The machine drive mechanism of claim 1 wherein said double rack member has a relatively small mass so that it has a fast time response to transverse forces between the teeth on the gears and the teeth on the double rack.

10. A machine drive mechanism as defined in claim 1 wherein the connection between said guide means on said double rack includes an elongated and reduced diameter extension of said guide means which can flex so as to permit some transverse movement of said double rack with respect to the axis of said guide means.

11. A machine drive mechanism as defined in claim 10 wherein said extension is secured to said guide means by a prestressed threaded connection.

12. A machine drive mechanism as defined in claim 10 wherein a substantial portion of said extension is located within a cavity in one of said guide means and double rack member.

13. A machine drive mechanism as defined in claim 10 wherein said extension passes axially through said double rack member with an annular space therebetween except where said extension is rigidly secured to the end of said double rack member.

14. A machine drive mechanism as defined in claim 10 wherein a substantial portion of said extension lies axially within a bore in said guide means with an annular space therebetween.

15. A machine drive mechanism as defined in claim 10 wherein said double rack member is secured at one of its ends to one of said power and energy absorbing units and a free end thereof extends between said gears.

* * * * *